(No Model.)

O. B. SHALLENBERGER.
INDICATOR FOR ELECTRIC CIRCUITS.

No. 383,665. Patented May 29, 1888.

Witnesses.
Geo. W. Breck,
Carrie E. Ashley

Inventor.
O. B. Shallenberger
By his Attorneys,
Pope Edgcomb & Terry.

United States Patent Office.

OLIVER B. SHALLENBERGER, OT ROCHESTER, ASSIGNOR TO THE WESTINGHOUSE ELECTRIC COMPANY, OF PITTSBURG, PENNSYLVANIA.

INDICATOR FOR ELECTRIC CIRCUITS.

SPECIFICATION forming part of Letters Patent No. 383,665, dated May 29, 1888.

Application filed September 1, 1887. Serial No. 248,469. (No model.)

*To all whom it may concern:*

Be it known that I, OLIVER B. SHALLENBERGER, a citizen of the United States, residing in Rochester, in the county of Beaver, in the State of Pennsylvania, have invented certain new and useful Improvements in Indicators for Electric Circuits, of which the following is a specification.

The invention relates to an organization of circuits and apparatus for indicating the current upon any given circuit; and the object is to provide convenient means for measuring and determining at the central station the difference of potential upon the work-circuit.

The invention consists in introducing into the circuit of the voltmeter an opposing electro-motive force, the amount of which is proportional to the current delivered to the work-circuit, and therefore approximately proportional to the fall of potential in transmission.

In a division of this application, Serial No. 257,409, filed December 9, 1887, the method herein set forth is claimed.

Figure 1:
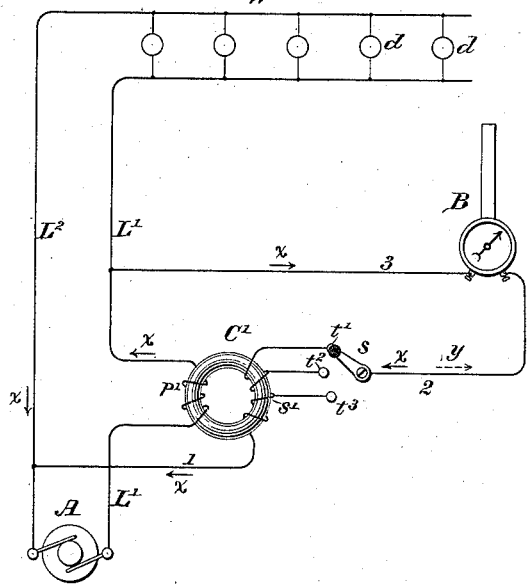
Figure 2:
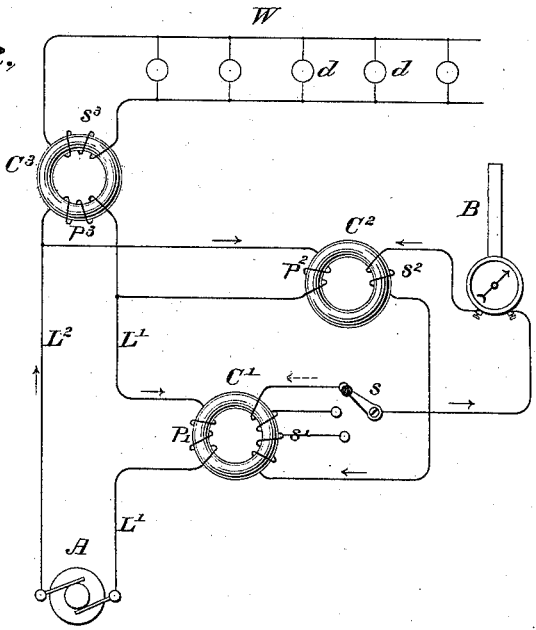

In the accompanying drawings, Figure 1 is a diagram illustrating the general organization of the apparatus, and Fig. 2 illustrates a modification.

Referring to Fig. 1, A represents a suitable source of alternating, undulatory, or pulsatory currents, and W a work-circuit connected therewith by conductors $L'$ and $L^2$. Translating devices $d\ d$ are connected in multiple arc in the work-circuit. The primary coil $p'$ of a converter, $C'$, is connected in series with the translating devices in the direct circuit of the conductor $L'$. The secondary coil $s'$ of the converter is connected by conductors 1 2 3 between the conductors $L'$ and $L^2$. The conductors 2 and 3 are connected with each other through a suitable indicator—such, for instance, as a Cardew voltmeter, B. The currents from the generator may be considered, for convenience, as flowing in the direction indicated by the arrows $x$. The induced current in the coil $s'$ will then be in the direction indicated by dotted arrow $y$. The value of this induced current or opposing electro-motive-force may be modified by means of a switch, S, capable of being placed in contact with different switch-points, $t'\ t^2\ t^3$, connected with different points in the length of one of the coils, as $s'$. By suitably adjusting the relative values of the two coils the indication of the voltmeter may be modified in any required proportion to the current flowing in the conductors $L'\ L^2$, and when once adjusted to the conditions of the circuit will show the difference of potential applied to the translating devices.

In Fig. 2 the converter $C'$ has its secondary coil $s'$ connected through the secondary coil $s^2$ of a secondary converter, $C^2$, instead of being directly connected across the lines $L'$ and $L^2$. The primary coil $p^2$ of the converter $C^2$ has its terminals connected with the lines $L'$ and $L^2$, respectively. This converter $C^2$ may be constructed to reduce the potential of the current received by the coil $p^2$ in any convenient ratio in case the current upon the lines $L'$ and $L^2$ is of too great a potential to be itself conveniently employed. In this instance the lines $L'$ and $L^2$ are represented as being connected through the primary coils $p^3$ of a converter, $C^3$, while the work-circuit W is derived from the secondary coil $s^3$.

I claim as my invention—

1. The combination, with a source of electricity and a work-circuit supplied therefrom, of an electric converter having its primary coil connected in series with the work-circuit and its secondary coil connected in multiple arc therewith, and an electric indicator connected in the circuit of the secondary coil, substantially as described.

2. In an indicator for electric circuits, the combination of a converter having its primary coil adapted to be connected in series with the work-circuit and its secondary coil connected to the terminals of the source of electricity, and an indicator operated by resultant currents traversing the secondary coil of the converter.

3. The combination, with a source of electricity and a work-circuit, of the lines $L'\ L^2$, supplying current thereto, the converter $C'$, having its primary coil $p'$ connected in the line $L'$, a circuit including the secondary coil $s'$, means for causing a current to traverse the coils $s'$, which current is dependent upon the difference of potential at the terminals of the source of electricity and upon the opposing action of the converter, and the indicator B, connected in the circuit of the coils $s'$.

4. In an indicator for electric circuits, a converter having one coil connected in series and the other coil connected in multiple arc with the work-circuit, and an indicator operated by currents traversing the last-named coil, substantially as described.

5. In an indicator for electric circuits, the combination of a converter having one coil connected in series and the other in multiple arc with the work-circuit, an indicator operated by currents traversing the latter coil, and means for varying the relative values of the two coils.

6. In an indicator for electric circuits, a converter having a primary coil receiving currents proportionate to the consumption in the work-circuit, and its secondary coil traversed by resultant currents due to the currents induced therein and to currents proportionate to the difference of potential at the terminals of the source, an electric indicating device connected in the secondary circuit, and means for varying the active length of the secondary coil.

7. In an indicator for electric circuits, a converter having a primary coil receiving currents proportionate to the consumption in the work-circuit, and its secondary coil traversed by resultant currents due to the currents induced therein and to currents proportionate to the difference of potential at the terminals of the source, and an electric indicating device connected in the secondary circuit.

In testimony whereof I have hereunto subscribed my name this 4th day of August, A. D. 1887.

OLIVER B. SHALLENBERGER.

Witnesses:
W. D. UPTEGRAFF,
L. B. STILLWELL.